(12) United States Patent
Tsukano

(10) Patent No.: US 11,448,914 B2
(45) Date of Patent: Sep. 20, 2022

(54) METHOD OF MANUFACTURING ELECTRONIC MODULE, METHOD OF MANUFACTURING OPTICAL MODULE, ELECTRONIC MODULE, OPTICAL MODULE, AND DEVICE

(71) Applicant: CANON KABUSHIKI KAISHA, Tokyo (JP)

(72) Inventor: Jun Tsukano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/075,203

(22) Filed: Oct. 20, 2020

(65) Prior Publication Data
US 2021/0132431 A1 May 6, 2021

(30) Foreign Application Priority Data
Oct. 31, 2019 (JP) .............................. JP2019-199241

(51) Int. Cl.
| | | |
|---|---|---|
| G02F 1/1333 | (2006.01) | |
| G03B 17/02 | (2021.01) | |
| H04N 5/225 | (2006.01) | |
| H04N 5/232 | (2006.01) | |

(52) U.S. Cl.
CPC .. *G02F 1/133308* (2013.01); *G02F 1/133382* (2013.01); *G03B 17/02* (2013.01); *H04N 5/2252* (2013.01); *H04N 5/22525* (2018.08); *H04N 5/23293* (2013.01); *G02F 1/133314* (2021.01); *G02F 1/133317* (2021.01)

(58) Field of Classification Search
None
See application file for complete search history.

(56) References Cited

U.S. PATENT DOCUMENTS

| | | | | |
|---|---|---|---|---|
| 6,611,302 | B1* | 8/2003 | Ueda | G02F 1/133308 |
| | | | | 349/58 |
| 2007/0195220 | A1* | 8/2007 | Ono | G02F 1/133308 |
| | | | | 349/58 |
| 2009/0033824 | A1* | 2/2009 | Nishikawa | G02F 1/133308 |
| | | | | 349/58 |

(Continued)

FOREIGN PATENT DOCUMENTS

| | | |
|---|---|---|
| JP | 2001-083901 A | 3/2001 |
| JP | 2016-018145 A | 2/2016 |

(Continued)

*Primary Examiner* — Rodney E Fuller
(74) *Attorney, Agent, or Firm* — Venable LLP

(57) ABSTRACT

A method of manufacturing an electronic module that comprises preparing an electronic device in which a first substrate and a second substrate have been joined and coupling the electronic device to a package member. The first substrate includes a front surface, a back surface on an opposite side of the front surface, and a first side surface between an edge portion of the front surface and an edge portion of the back surface. The package member includes a first portion that includes an opening and a second portion that is arranged at a position which does not overlap the opening. The coupling includes bringing the first side surface into contact with the second portion in a state in which the second substrate is positioned between the first portion and the first substrate, and fixing the package member and the electronic device.

21 Claims, 9 Drawing Sheets

(56) References Cited

U.S. PATENT DOCUMENTS

| | | | |
|---|---|---|---|
| 2009/0115942 A1* | 5/2009 | Watanabe | G02F 1/1339 |
| | | | 349/96 |
| 2010/0181667 A1 | 7/2010 | Iwase et al. | |
| 2010/0309316 A1* | 12/2010 | Kojima | H01L 31/02325 |
| | | | 348/164 |
| 2011/0210929 A1 | 9/2011 | Hiranobu | |
| 2012/0162880 A1* | 6/2012 | Yoon | G02F 1/1339 |
| | | | 361/679.01 |
| 2015/0098030 A1 | 4/2015 | Sato | |
| 2015/0153612 A1 | 6/2015 | Hirabayashi | |
| 2015/0179623 A1 | 6/2015 | Ono et al. | |
| 2018/0074360 A1 | 3/2018 | Miyazaki | |
| 2019/0094454 A1 | 3/2019 | Aoshima et al. | |
| 2020/0098808 A1* | 3/2020 | Wu | H01L 27/14618 |
| 2020/0301192 A1* | 9/2020 | Huang | G02F 1/133308 |

FOREIGN PATENT DOCUMENTS

| | | |
|---|---|---|
| JP | 2017-010663 A | 1/2017 |
| WO | 2014/125973 A1 | 8/2014 |

\* cited by examiner

C-C' SECTION

D-D' SECTION

US 11,448,914 B2

METHOD OF MANUFACTURING ELECTRONIC MODULE, METHOD OF MANUFACTURING OPTICAL MODULE, ELECTRONIC MODULE, OPTICAL MODULE, AND DEVICE

BACKGROUND OF THE INVENTION

Field of the Invention

The present invention relates to a method of manufacturing an electronic module, a method of manufacturing an optical module, an electronic module, an optical module, and a device.

Description of the Related Art

An electronic module used in an image capturing apparatus, a display apparatus, or the like generally includes an electronic device including an element substrate on which electronic elements and the like are formed and a substrate which faces the element substrate and is used to protect the element substrate, and a package member for containing the electronic device.

Japanese Patent Laid-Open No. 2001-83901 discloses that a display panel which is formed by bonding a pair of panel materials together is mounted onto a spacer portion which forms a holding frame. By causing only the panel material, which is in contact with the spacer portion, to be in contact with a holding wall of the holding frame, the generation of a foreign object due to scraping of the holding wall is suppressed.

In image capturing apparatuses and display apparatuses, an electronic module may need to be installed with high accuracy respect to the housing. To install the electronic module with high accuracy, an electronic device needs to be installed accurately with respect to the package member in which the electronic module is to be contained.

SUMMARY OF THE INVENTION

The present invention has been made in consideration of the above situation, and provides an advantageous technique to install accurately the electronic device to the package member.

According to an aspect of the invention, the present invention provides a method of manufacturing an electronic module that comprises preparing an electronic device in which a first substrate and a second substrate have been joined and coupling the electronic device to a package member, wherein the first substrate includes a front surface on a side of the second substrate, a back surface on an opposite side of the front surface, and a first side surface between an edge portion of the front surface and an edge portion of the back surface, the second substrate includes a first main surface on a side of the first substrate, a second main surface on an opposite side of the first main surface, and a second side surface between an edge portion of the first main surface and an edge portion of the second main surface, the package member includes a first portion that includes an opening and a second portion that is arranged at a position which does not overlap the opening, and the coupling includes bringing the first side surface into contact with the second portion in a state in which the second substrate is positioned between the first portion and the first substrate, and fixing the package member and the electronic device in a state in which the first side surface is in contact with the second portion.

Further features of the present invention will become apparent from the following description of exemplary embodiments (with reference to the attached drawings).

DESCRIPTION OF THE EMBODIMENTS

Figure 1A:
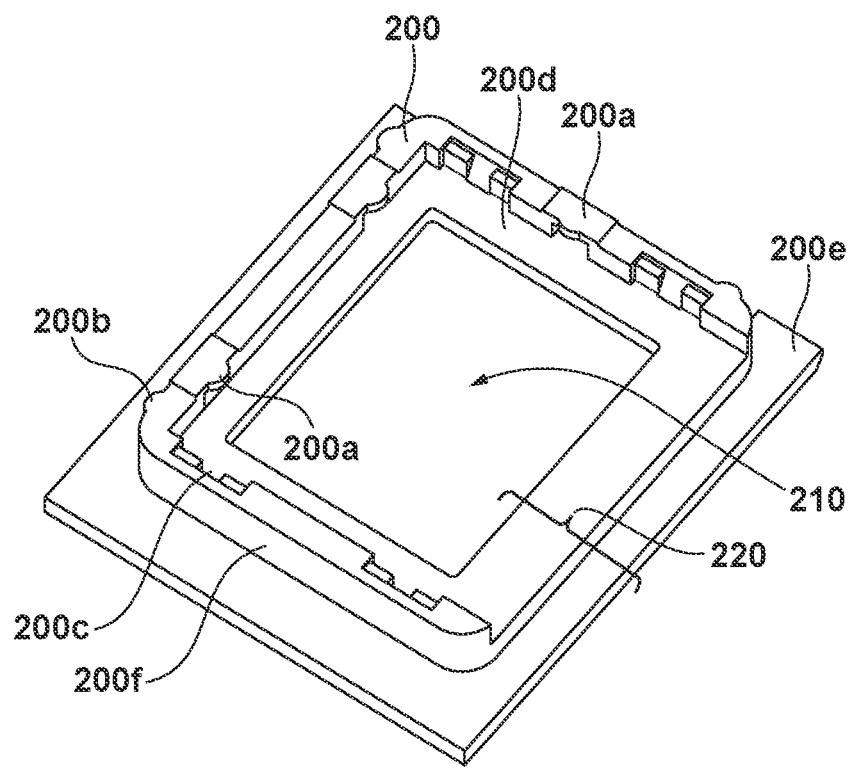
FIGS. 1A and 1B are schematic views showing a package member and an electronic module according to the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Note that each member can be referred to as an Lth member, and the arrangement of each portion can be referred to as an Nth portion or an Mth portion. L, M, and N are natural numbers in this case.

First Embodiment

Figure 1B:
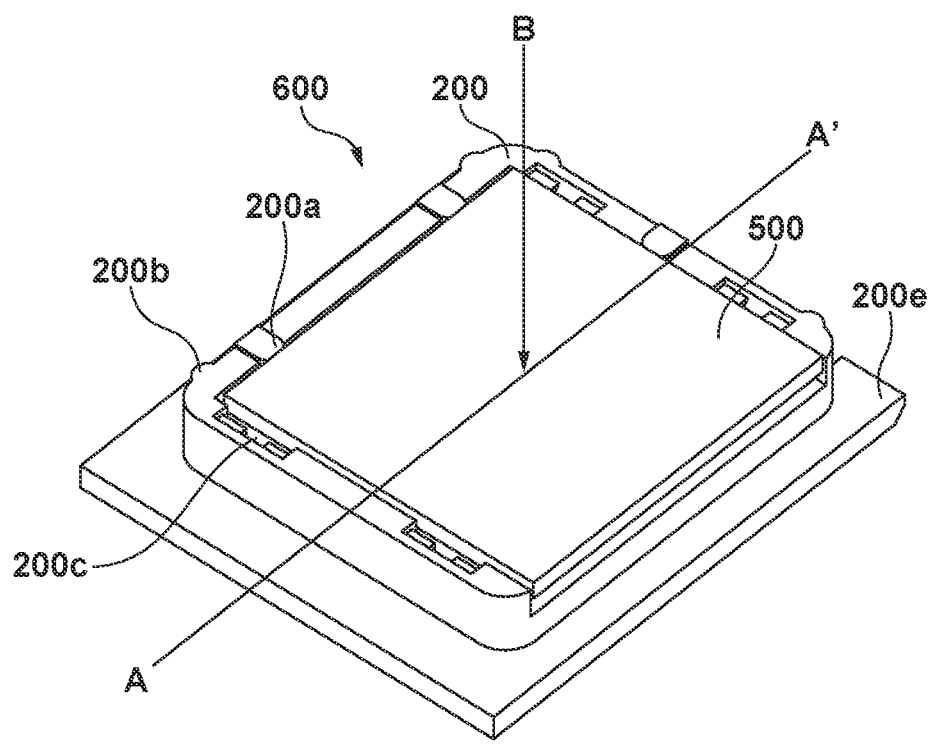

An electronic module according to the present invention will be described with reference to FIGS. 1A and 1B. FIG. 1A is a perspective view of a package member 200 for mounting an electronic device. FIG. 1B is a perspective view of an electronic module 600 in which an electronic device 500 is mounted onto the package member 200. The electronic module 600 includes the package member 200 for mounting an electronic device and the electronic device 500.

The package member 200 can be made of a material such as mPPE (modified polyphenylene ether), a liquid crystal polymer, polyamide, or the like. The package member 200 is a frame-shaped member that has an opening 210. The weight of the package member 200 can be reduced by arranging the opening 210 in the package member 200. The package member 200 includes a base 220 that has the opening 210 and a wall portion 200f that protrudes in a penetration direction of the opening 210 with respect to the base 220. The base 220 includes an inner frame portion 200*d* that is positioned closer to the inner side (on the side of the opening 210) than the wall portion 200*f* in a planar view from the penetration direction of the opening 210. The inner surface of the inner frame portion 200*d* delimits the opening 210. The base 220 includes an outer frame portion 200*e* that is positioned closer to the outer side (on the opposite side of the side of the opening 210) than the wall portion 200*f* in a planar view from the penetration direction of the opening 210. The wall portion 200*f* is arranged in a position that overlaps the base 220 but does not overlap the opening 210. The package member 200 can be a member that is integrally formed by the wall portion 200*f*, the inner frame portion 200*d*, and the outer frame portion 200*e*. The wall portion 200*f* includes inner convex portions 200*a* that protrude toward the inner side (the side of the opening 210) of the package member 200. The wall portion 200*f* include recessed inner concave portions 200*c* on the inner side (the side of the opening 210) of the package member 200. The wall portion 200*f* includes outer convex portions 200*b* that protrude toward the outer side (the opposite side of the side of the opening 210) of the package member 200.

In the electronic module 600 shown in FIG. 1B, each inner convex portion 200*a* protruding toward the inner side of the package member 200 is brought into contact with the electronic device 500 so that each inner convex portion 200*a* functions as a positioning portion for positioning the electronic device 500. The package member 200 includes the outer convex portions 200*b* that protrude toward the outer side of the package member 200 and will be in contact with a housing for mounting the electronic module. Furthermore, the package member 200 may be provided with, on the wall portion 200*f*, the inner concave portions 200*c* to which an adhesive for adhering the electronic device and the package member together is supplied. The package member 200 also includes the inner frame portion 200*d* that functions as a support portion for supporting the electronic device 500.

The inner frame portion 200*d* forms a part of the bottom portion of the package member 200. The inner frame portion 200*d* includes a surface on the side for mounting the electronic device 500 and a surface on the opposite side of this surface. The inner convex portions 200*a* are arranged in the wall portion 200*f* extending from the inner frame portion 200*d*. Each inner convex portion 200*a* is arranged on the inner surface side of the wall portion 200*f* so as to be apart by a predetermined distance from the surface for mounting the electronic device 500 of the inner frame portion 200*d*. The outer convex portions 200*b* are arranged on the outer surface side of the wall portion 200*f*. The electronic device 500 is contained so as to be surrounded by the wall portion 200*f* and be supported by the inner frame portion 200*d*. The opening 210 of the package member 200 is arranged so that the opening 210 is at a position surrounded by the wall portion 200*f*. The inner concave portion 200*c* is a portion which is recessed more than the other portions on the inner surface, of the wall portion 200*f*, facing the side surfaces 45 and 65 of the electronic device 500. The inner concave portions 200*c* may be groove-shaped concave portions, of the wall portion 200*f*, which are formed from an upper surface on the opposite side of the inner frame portion 200*d* to a lower surface in the direction of the inner frame portion 200*d*. When the package member 200 and the electronic device 500 are to be coupled, an adhesive can be supplied to each inner concave portion 200*c* to fix the electronic device 500 to the package member 200. Also, as shown in FIGS. 1A and 1B, the outer frame portion 200*e* that spreads from the wall portion 200*f* to the outer side of the package member 200 is arranged on the package member 200.

In the electronic module 600, the electronic device 500 is contained so as to be surrounded by the wall portion 200*f* of the package member 200 as shown in FIG. 1B. In a contained state, the electronic device 500 is positioned with respect to the package member 200 so that one surface of the electronic device 500 is supported by the inner frame portion 200*d* and parts of the side surfaces of the electronic device 500 are set in contact with the inner convex portions 200*a*. The electronic device 500 is electrically connected to a flexible substrate or a glass epoxy substrate via a bump, an anisotropic conductive film, or an anisotropic conductive paste so as to be able to perform power supply and exchange signals with an external circuit. As shown in FIGS. 1A and 1B, the wall portion 200*f* need not be arranged over the entire circumference of the package member to allow wiring to be connected to the electronic device 500.

Figure 2A:
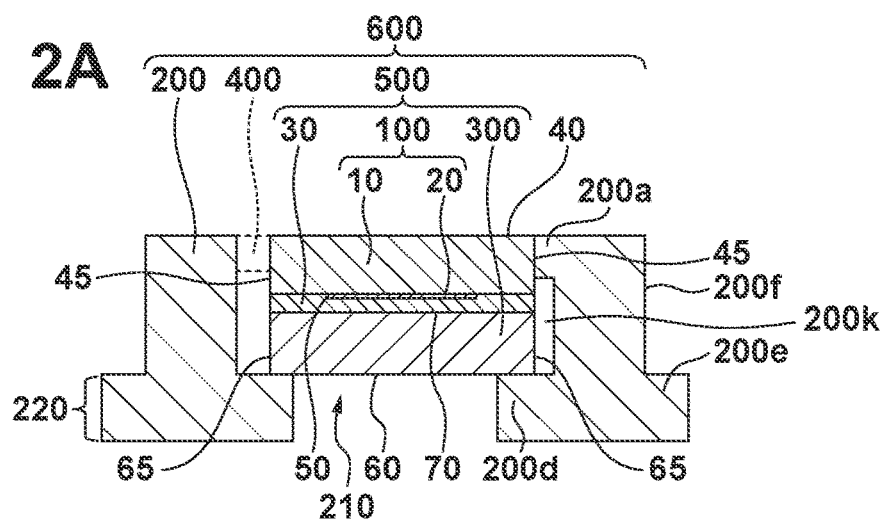
FIGS. 2A to 2D are views showing the electronic module according to the present invention.

FIG. 2A is a sectional view taken along a line A-A' of the electronic module shown in FIG. 1B. The electronic device 500 and the package member 200 are fixed to each other by a fixing member 400. The fixing member 400 can be a member obtained by curing a liquid adhesive such as a resin or the like.

The electronic device 500 includes a first substrate 100 that is formed by a base 10, which is formed by an semiconductor such as silicon or the like or an insulator such as glass or the like, and electronic elements, which are formed on one main surface (a front surface 50) of the first substrate 100. The electronic device 500 further includes a second substrate 300 that has been formed so as to face the one main surface of the first substrate 100. The second substrate 300 can be, for example, a protection substrate for protecting the first substrate 100, a support substrate for supporting the first substrate 100, or a reinforcement substrate for reinforcing the strength of the electronic device 500. If the second substrate 300 is a protection substrate or a support substrate, electronic elements may not be formed on the second substrate 300. Typically, the second substrate 300 is made of an insulator such as glass, a crystal, a resin, or the like. In a case in which the first substrate 100 includes a pixel region, the second substrate 300 can be a translucent substrate made of a translucent material to transmit light emitted from the pixel region or to transmit light into the pixel region. The opening 210 of the package member 200 can provide an optical path through which light to be handled in the electronic device 500 will pass. Electronic elements may also be formed on the second substrate 300, and the electronic device 500 may be a stacked substrate electronic device in which electronic elements have been formed on both the first substrate 100 and the second substrate 300. In a case in which the base 10 is made of silicon, the first substrate 100 may be referred to as a silicon substrate. The first substrate 100 may be a substrate obtained by forming a thin-film electronic element has been formed on the base 10 formed by an insulator such as glass or the like.

In the first substrate 100, a region that overlaps the opening 210 will be referred to as a central region 20 and a region in the periphery of the central region 20 will be referred to as a peripheral region. The central region 20 will typically become a pixel region in a case in which display elements or photoelectric conversion elements are to be arranged in the first substrate 100. Although a circuit (peripheral circuit) connected to the electronic elements of the central region 20 is typically arranged in the peripheral region, electronic elements may not be formed at all in the peripheral region. In the second substrate 300, a portion facing the central region 20 of the first substrate 100 will be referred to as a central portion, and a portion facing the peripheral region of the first substrate 100 will be referred to as a peripheral portion. The central portion of the second substrate 300 is positioned between the opening 210 and the central region 20 of the first substrate 100. The peripheral portion of the second substrate 300 is positioned between the base 220 (the inner frame portion 200d) and the peripheral region of the first substrate 100. A pixel region can be arranged in the central portion of the second substrate 300 in a case in which the electronic device 500 is to serve as a display device or an image capturing device.

The first substrate 100 and the second substrate 300 are joined by a joint member 30 intervening between them. The front surface 50, which is on a side joined to the second substrate 300 and on which electronic elements are formed, and a back surface 40 which is on the opposite side of the front surface 50 are included in the first substrate 100. The first substrate 100 includes first side surfaces 45 between an edge portion of the back surface 40 and an edge portion of the front surface 50. The second substrate 300 includes a first main surface 70, which is on the side joined to the first substrate 100, and a second main surface 60 which is on the opposite side. The second substrate 300 includes a second side surface 65 between the edge portion of the second main surface 60 and the edge portion of the first main surface 70. The distance between the front surface 50 and the base 220 (the inner frame portion 200d) is smaller than the distance between the back surface 40 and the base 220 (inner frame portion 200d). That is, the first substrate 100 is oriented so that the front surface 50, on which the electronic elements are formed, will be arranged on a side closer to the base 220 than the back surface 40. An orientation arrangement similar to this kind of orientation arrangement of the first substrate 100 will employed even in a case in which the electronic device 500 is to be mounted onto the package member 200 without the second substrate 300 (and the joint member 30).

The first side surfaces 45 of the first substrate 100 of the electronic device 500 contact the inner convex portions 200a as the first positioning portions of the package member 200. A gap 200k is provided between the base 220 and each inner convex portion 200a. This gap 200k can suppress the second side surface 65 of the second substrate 300 from contacting the wall portion 200f. Two or more inner convex portions 200a can be arranged on a single side of the wall portion 200f.

Figure 2B:
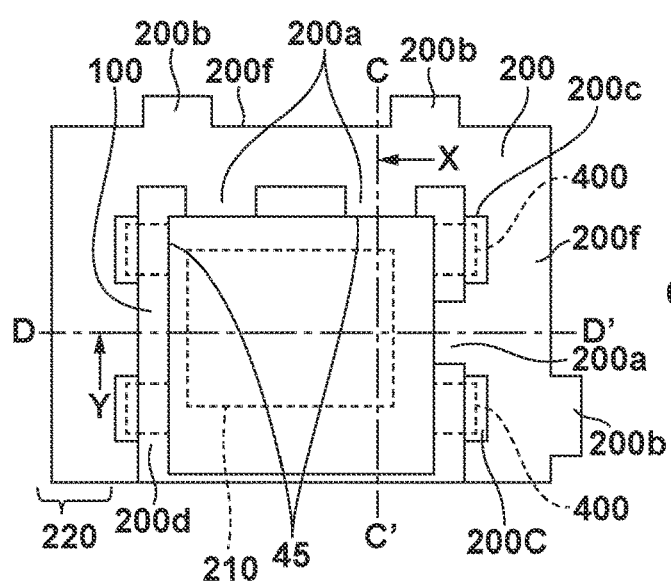

FIG. 2B is a plan view of the electronic module 600 obtained when FIG. 1B is viewed from a direction of an arrow B perpendicular to the front surface 50 joined to the second substrate 300 and the back surface 40 on the opposite side of the first substrate 100 of the electronic device 500. In a state in which the electronic device 500 is in contact with the inner convex portions 200a, the electronic device 500 can be fixed by the fixing member 400 supplied to the inner concave portions 200c. Also, if the adhesive force between the electronic device 500 and the package member 200 needs to be improved, an adhesive may be further arranged between the electronic device 500 and the inner convex portions 200a.

Figure 2C:
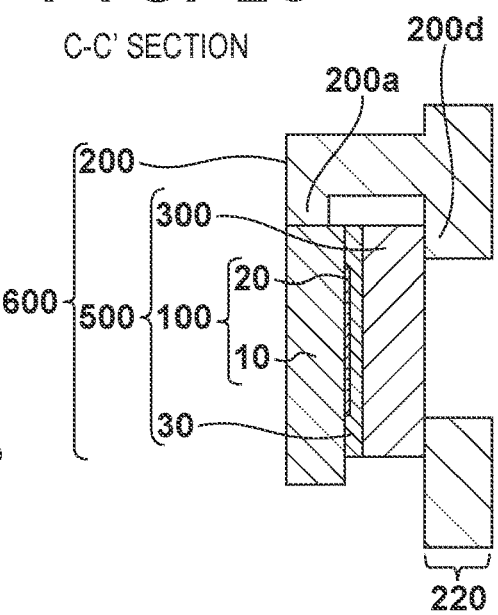
Figure 2D:
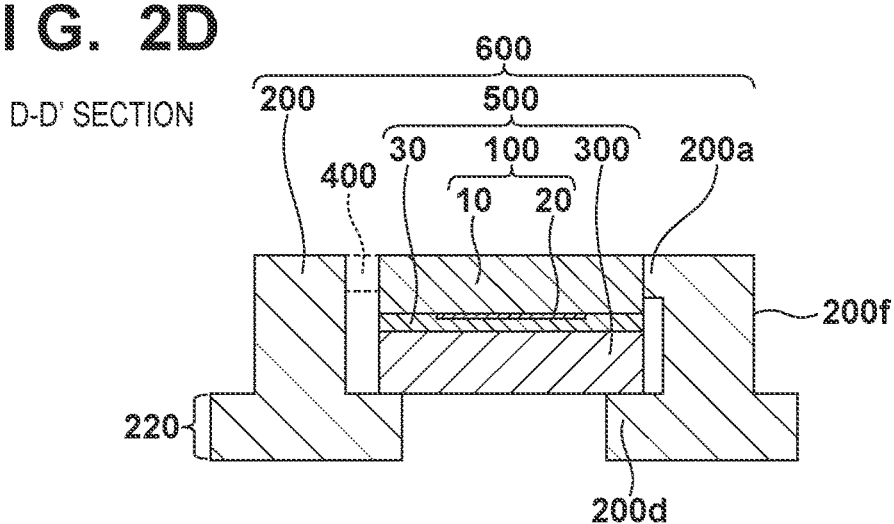

In a case in which the electronic device 500 is to be planarly (two-dimensionally) positioned with respect to the package member 200, the inner convex portions 200a as the first positioning portions may be arranged on two adjacent sides of the wall portion 200f instead of a single side of the wall portion 200f of the package member 200. In this example, two inner convex portion 200a are arranged on the upper side and one inner convex portion 200a is arranged on the right side as shown in FIG. 2B. Also, a plurality of the outer convex portions 200b may be arranged so that the portions will face different directions. The planar and three-dimensional positioning accuracy can be improved by allowing the inner convex portions 200a and the outer convex portions 200b to perform positioning in different directions. FIG. 2C is a sectional view taken a line C-C' of FIG. 2B. Also, FIG. 2D is a sectional view taken along a line D-D' of FIG. 2B. In FIGS. 2C and 2D, a virtual plane that is obtained by extending the back surface 40 of the first substrate 100 of the electronic device in a horizontal direction is substantially flush with the inner convex portions 200a and the upper surface of the wall portion 200f. In this embodiment, as shown in FIG. 2C, the wall portion 200f is not arranged in a part of the package member 200 so that the wiring can be passed through.

In a case in which the virtual plane has a positional relationship that does not intersect with the inner convex portions 200a and the wall portion 200f, a heat dissipation sheet can easily be in contact with the back surface of the first substrate 100. As a result, a good heat dissipation characteristic can be obtained. However, since a portion of the electronic device 500 will protrude above the inner convex portions 200a and the wall portion 200f in this case, there is a concern that the first substrate 100 will become damaged during the assembly process. Hence, if the first substrate 100 is fragile or is to avoid damage, it is possible to prevent the first substrate 100 from being damaged by setting the virtual plane at a height that will intersect the side surface of the protruding portion. To implement the intersecting structure, the height of the wall portion 200f can be increased more than the thickness of the electronic device 500. As shown in FIGS. 2A to 2D, the back surface 40 of the first substrate 100 is not covered by another member.

Figure 3A:
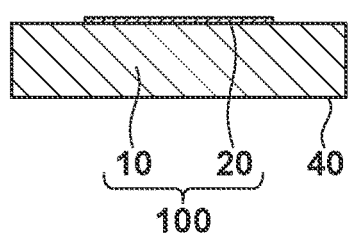
FIGS. 3A to 3D are views showing a method of manufacturing the electronic module according to the present invention.

A method of manufacturing the electronic module 600 according to the present invention will be described next with reference to FIGS. 3A to 3D. First, as shown in FIG. 3A, the first substrate 100 in which external connection terminals and electronic elements such as liquid crystal elements, organic EL elements, and the like are arranged on the base 10 made of silicon or glass is prepared. Note that the illustration of the external connection terminals is omitted from FIGS. 3A to 3D. The electronic elements may be, in addition to electronic elements such as transistors or the like, display elements such as liquid crystal elements or organic EL elements, photoelectric conversion elements such as photodiodes, and piezoelectric elements. The first substrate 100 may be a silicon substrate including a silicon base on which the electronic elements have been formed.

Figure 3B:
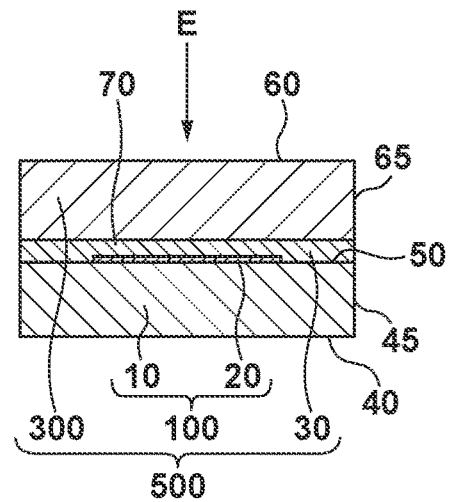
Figure 3C:
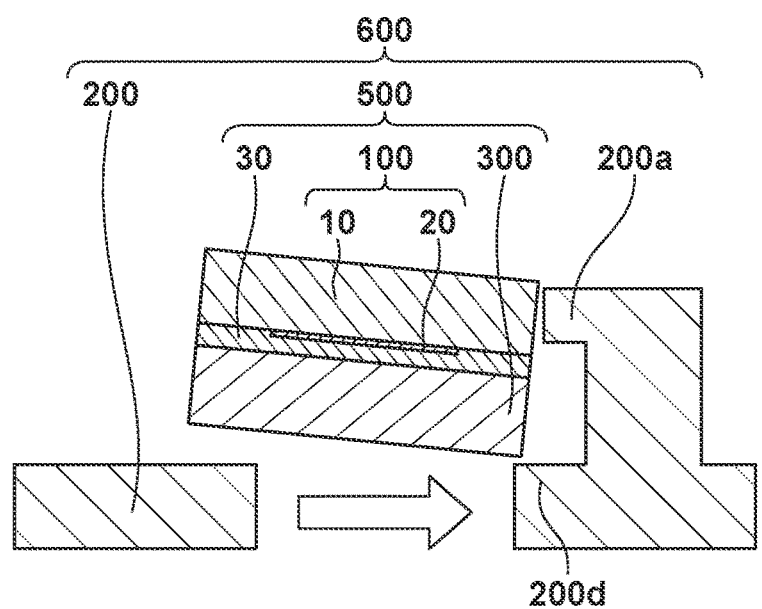
Figure 3D:
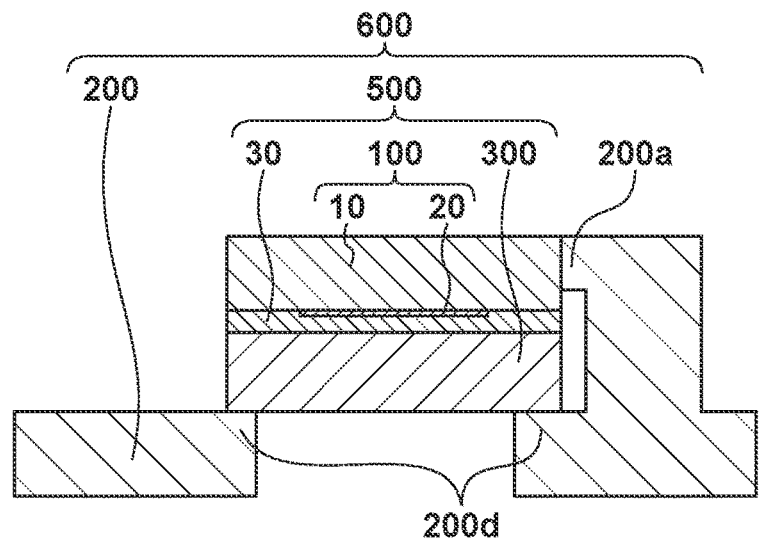

Next, as shown in FIG. 3B, the prepared second substrate 300 is bonded to the first substrate 100 with the joint member 30 intervening between them. The joint member 30 may be an adhesive. If an adhesive is to be used, the second substrate 300 and the first substrate 100 may be bonded after the adhesive has been applied to the first substrate 100 or the first substrate 100 and the second substrate 300 may be bonded after the adhesive has been applied to the second substrate 300. The substrates may be bonded after the adhesive has been applied to one of the substrates or after the adhesive has been applied to both of the substrates. Next, the electronic device 500 is mounted onto the package member 200 as shown in FIG. 3D by bringing the second main surface 60, on the opposite side of the front surface 50, of the second substrate 300 of the electronic device 500 into contact with the inner frame portion 200d as shown in FIG. 3C. At this time, the side surface of the substrate to be installed in a highly accurate position is brought into contact with each inner convex portion 200a of the package member 200. Thus, in a case in which the electronic device includes photoelectric conversion elements or display elements, the positional relationship between the opening and an image capturing unit formed by the image capturing elements or a display unit formed by the display elements can be determined accurately. The side of the substrate that is not brought into contact with each inner convex portion 200a may not be in contact with the wall portion 200f but may be spaced apart from the wall portion 200f. In this embodiment, the second substrate 300 can be mounted spaced apart from the wall portion 200f with a space in between them.

Figure 4:
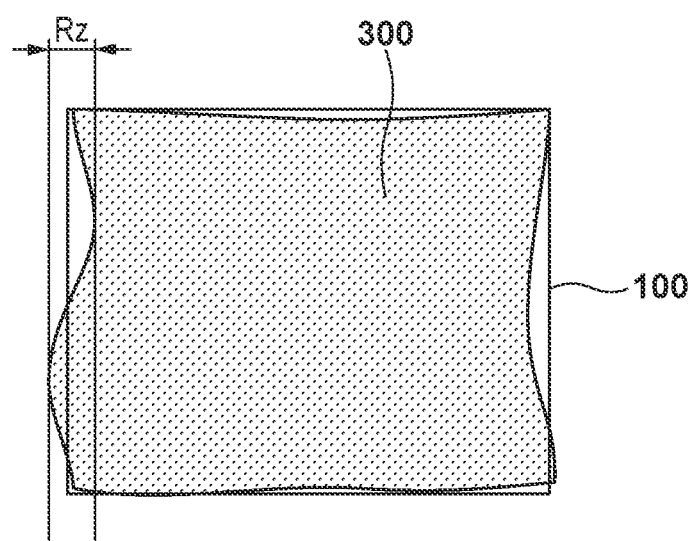
FIG. 4 is a view showing the roughness of a side surface of the substrate.
Figure 5A:
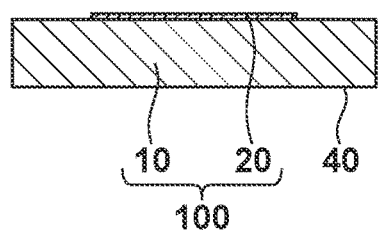
FIGS. 5A to 5D are views showing the method of manufacturing the electronic module according to the present invention.
Figure 5B:
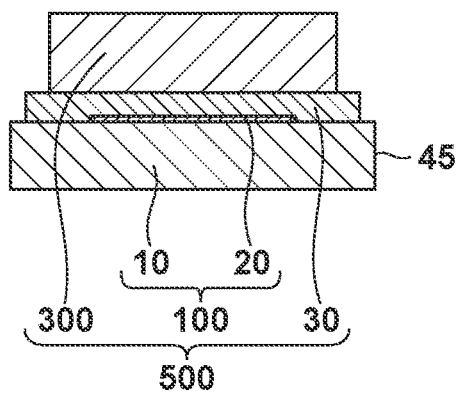
Figure 5C:
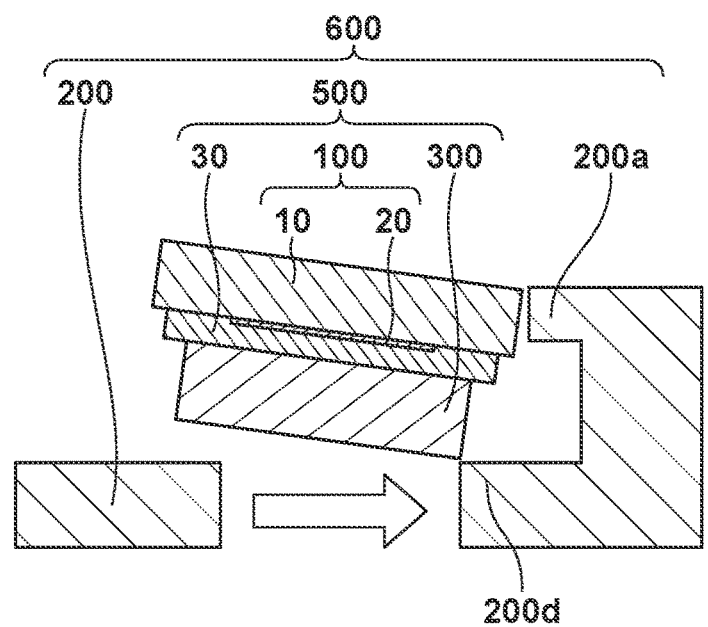
Figure 5D:
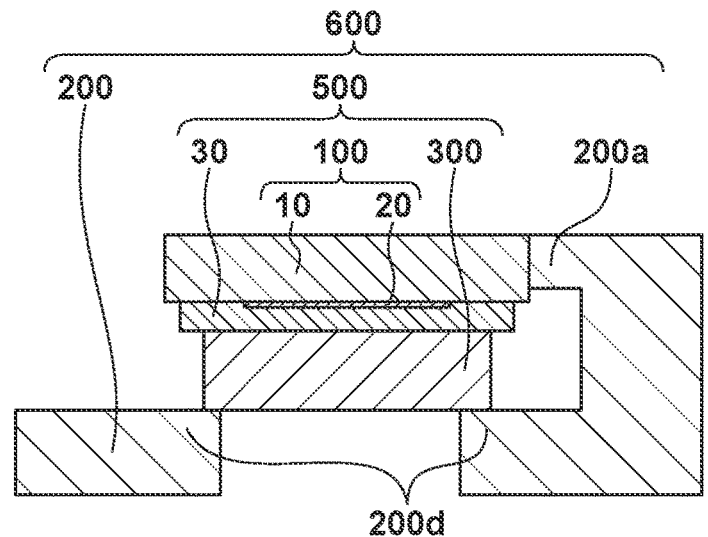

FIG. 4 is a schematic plan view in which the electronic device 500 is viewed planarly from the direction of an arrow E of FIG. 3B. The first substrate 100 is a silicon substrate on which electronic elements have been formed. In a case in which the second substrate 300 is made of glass, the electronic device 500 can be installed more accurately by bringing each first side surface 45 of the first substrate 100 into contact with the corresponding inner convex portion 200a because the unevenness of the cut surface of silicon is smaller than that of glass.

To perform highly accurate positioning, it is more suitable to bring each inner convex portion 200a into contact with a side surface, of the substrate, which has a smaller maximum height Rz of surface roughness. As a result, the attachment position accuracy of the electronic device can also be improved. When the first substrate 100 has been brought into contact with the inner convex portions 200a, an adhesive as the fixing member 400 is supplied to each inner concave portion 200c in a state in which the electronic device 500 has been mounted onto the inner frame portion 200d as shown in FIG. 3D. When the electronic device 500 and the package member 200 are to be coupled together, they are fixed by the fixing member 400. Although an arbitrary adhesive can be used as the adhesive, a UV-curing adhesive can be used in a case in which the electronic device is characterized by low heat resistance.

In the electronic module according to the present invention, the electronic device can be accurately installed because the inner convex portions 200a of the package member 200 will be brought into contact with the side surface of the substrate to be positioned with high accuracy. In this case, since the first side surface of the first substrate 100 can be brought into contact with the inner convex portions 200a in a state in which the back surface 40 of the first substrate 100 faces upward while mounting the main surface of the second substrate 300 on a portion of the inner frame portion 200d, it can facilitate the attachment process and improve the attachment accuracy.

Furthermore, since the back surface 40, of the first substrate 100 of the electronic device 500, which is on the opposite side of the surface joined to the second substrate 300 and is not arranged with an adhesive member will be exposed, an external frame component becomes unnecessary. As a result, the cost can be reduced by this reduction in the number of components. In addition, since a heat dissipation sheet can directly be in contact with the electronic device 500, the heat dissipation property of the electronic device can be improved. As a result, the life and the output of the electronic device can be increased.

The electronic device 500 was formed by adhering the first substrate 100 to the second substrate 300 in the above description. However, the electronic device 500 may be prepared by preparing a wafer on which a plurality of first substrates 100 have been formed and a third substrate including a plurality of second substrates 300, joining the wafer and the third substrate with an adhesive, and directly dicing and dividing the joined wafer and substrate by a dicing blade.

Second Embodiment

An electronic module according to this embodiment will be described with reference to FIGS. 5A to 5D. FIGS. 5A to 5D are schematic sectional views for explaining a second structure of an electronic component according to the present invention. This embodiment differs from the first embodiment in that a second substrate 300 is a size smaller than a first substrate 100. Setting the second substrate 300 to be a size smaller than the first substrate 100 can suppress a joint member 30 that has leaked out during a substrate bonding operation from spreading to the side surface of a first substrate 100. The joint member 30 may be an adhesive. If an adhesive is to be used, the second substrate 300 and the first substrate 100 may be bonded after the adhesive has been applied to the first substrate 100 or the first substrate 100 and the second substrate 300 may be bonded after the adhesive has been applied to the second substrate 300. The substrates may be bonded after the adhesive has been applied to one of the substrates or after the adhesive has been applied to both of the substrates. The manufacturing process in which the first substrate 100 is brought into contact with each corresponding inner convex portion 200a is the same as that of the first embodiment.

In this embodiment, since each inner convex portion 200a of a package member can be brought into contact with the corresponding side surface of the first substrate 100 which is to be positioned with high accuracy, an electronic module 600 can be installed with high accuracy. Since each first side surface 45 of the first substrate 100 is brought into contact with the corresponding inner convex portion 200a in a state in which a back surface 40 of the first substrate 100 faces upward while mounting a main surface of the second substrate 300 on an inner frame portion 200d of the package member, it can facilitate the attachment process and improve the attachment accuracy. In addition, since the second substrate 300 is a size smaller than the first substrate 100, when the first substrate 100 and the second substrate 300 are to be joined, the joint member 30 can be suppressed from leaking out to the side surface of the first substrate 100.

Third Embodiment

Figure 6A:
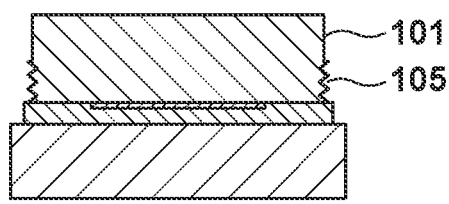
FIGS. 6A and 6B are views showing the electronic module according to the present invention.
Figure 6B:
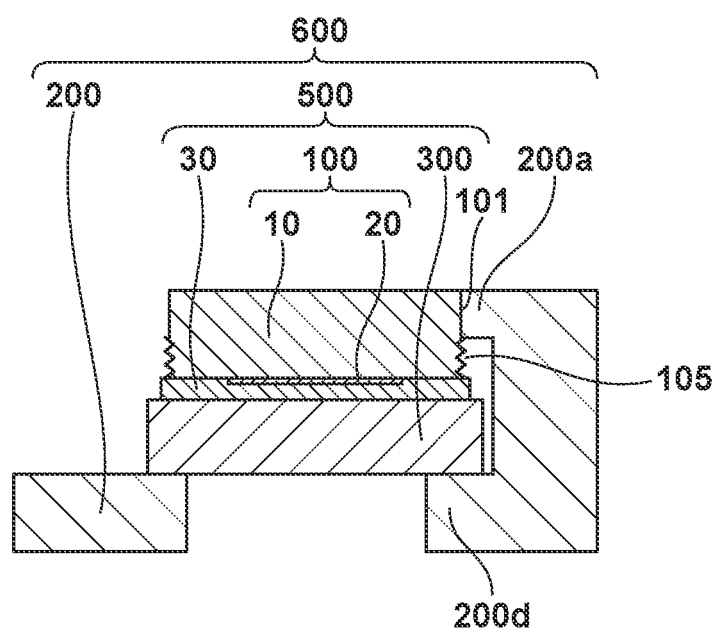

An electronic module according to this embodiment will be described with reference to FIGS. 6A and 6B. FIGS. 6A and 6B are schematic sectional views for explaining a third structure of the electronic module according to the present invention. This embodiment differs from the first embodiment in that a first side surface which is perpendicular to a back surface of a first substrate 100 is formed by two surfaces with different surface roughnesses.

As a dicing method for dividing a substrate other than a method in which a substrate is completely divided by using only a dicing blade, there is a method in which a substrate is ultimately divided by an application of an external force after incisions have been formed by a dicing blade. The roughness of the side surface that has been cut can be minimized more when the dicing blade is used to divide the substrate.

A method of creating an electronic device by dividing a substrate by an external force will be described hereinafter. A wafer that includes the first substrate 100 is prepared. In the process for dividing the wafer, the method that uses the dicing blade and an external force in combination is used. First, a dicing blade is used to make incisions on one surface of the wafer. Each incision portion made by the dicing blade becomes a side surface 101 of the first substrate 100. Next, each side surface 105 is formed by dividing the wafer by an external force. The first substrate 100 that has two side surfaces, that is, the side surface 101 and the side surface 105, is formed in this manner. An electronic device 500 is formed by bonding this first substrate 100 to a second substrate 300. The side surface 105 that has been cut by the external force has a rough front surface compared to that the side surface 101 that has undergone a cutting process by the dicing blade. Hence, when an electronic device 500 is to be brought into contact with each inner convex portion 200a which is used for positioning the electronic device with high accuracy, the position accuracy can be improved more by bringing the side surface 101 that has been cut by the dicing blade into contact with each inner convex portion 200a.

In the dividing method using an external force, there is also a dividing method in which a wafer including a portion corresponding to the first substrate 100 and a wafer including a portion corresponding to the second substrate 300 are prepared and bonded and the bonded wafers are subsequently divided. The wafer including a portion corresponding to the first substrate 100 and the wafer including a portion corresponding to the second substrate 300 are bonded. An adhesive can be used for the bonding. If an adhesive is to be used, the bonding may be performed by applying the adhesive on one of the wafers or by applying the adhesive to both of the wafers. After the bonding, the dicing blade is used to make incisions on the wafer including the portion corresponding to the first substrate 100. The depth of each incision can be shallower than that used to separate the wafer. Subsequently, an electronic device in which the first substrate 100 and the second substrate 300 have been joined can be obtained by dividing the bonded wafers by an external force. In this case as well, the portion that has been incised by the dicing blade and has a small surface roughness can be set as the side surface 101 and be brought into contact with each inner convex portion 200a.

An electronic module 600 is completed as described above. The electronic module 600 according to this embodiment relates to a case in which a step which has a different roughness is generated, due to reasons related to manufacturing, on the side surface of the first substrate 100 which is to be positioned with high accuracy. Since the smooth side surface 101 of the first substrate 100 and each inner convex portion 200a of the package member are brought into contact, the electronic device 500 can be installed in a package member 200 with high accuracy. In this case, since the side surface 101 of the first substrate 100 can be brought into contact with each inner convex portion 200a in a state in which a back surface 40 of the first substrate 100 faces upward while mounting a second main surface 60 of the second substrate 300 on an inner frame portion 200d, it can facilitate the attachment process and improve the attachment accuracy.

Figure 7A:
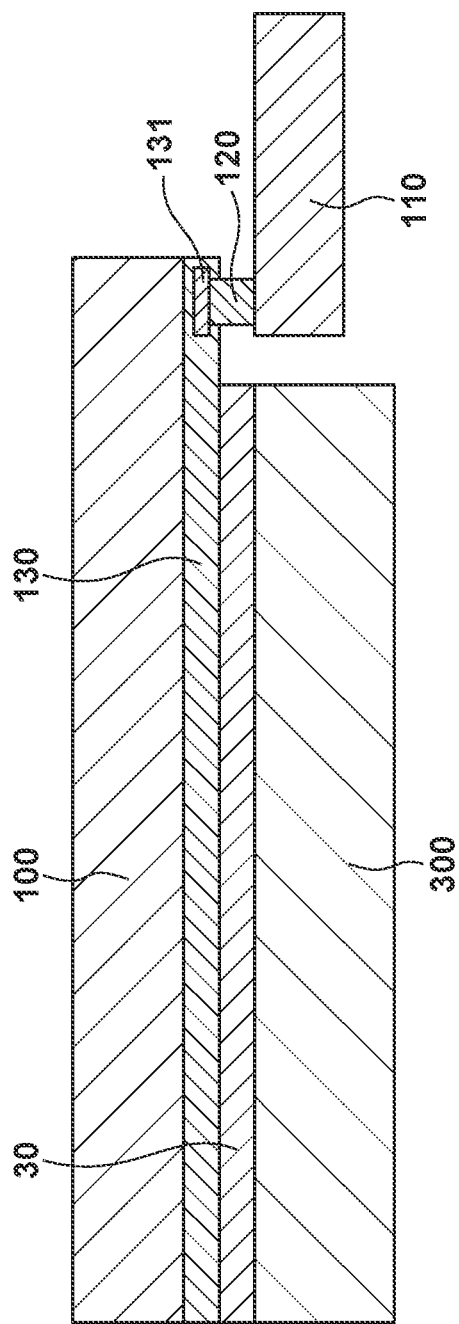
FIGS. 7A and 7B are views showing the electronic module according to the present invention.
Figure 7B:
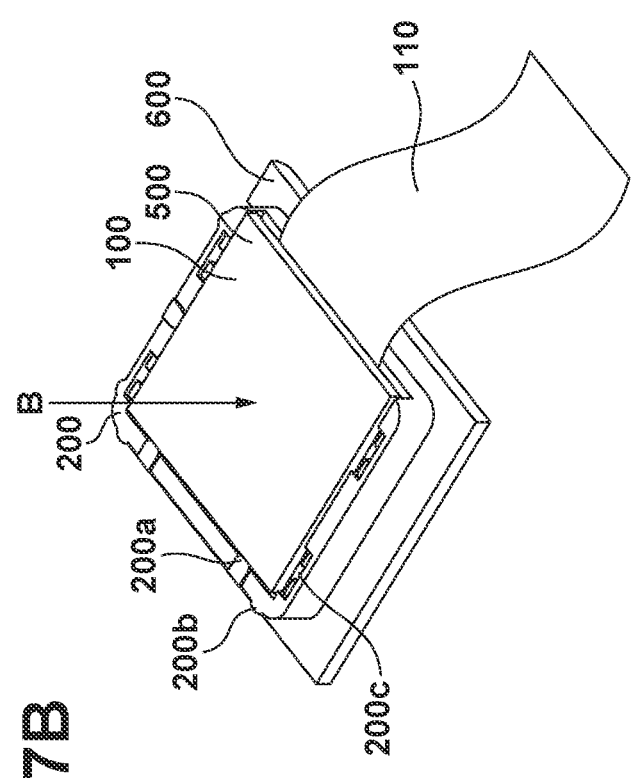

A method of connecting the electronic module 600 formed according to the above-described first to third embodiments to an external circuit will be described next with reference to FIGS. 7A and 7B. A wiring structure 130 is formed on the first substrate 100. An electrical terminal 131 is arranged at an end of the wiring structure 130 so that the wiring to an external circuit can be arranged on one end of the first substrate 100. For example, the electrical terminal 131 can be arranged by forming a portion of the second substrate 300, made of glass for the like, so that the wiring structure of the first substrate 100 will be exposed. A wiring member 110 can be connected to the electrical terminal 131 of the first substrate 100 via a conductive member 120 so that connection with an external circuit can be established. Although an anisotropic conductive film (ACF) can be used as the conductive member 120 to be used for connecting to an external circuit, solder may be used. Although a flexible printed circuit (FPC) board can be used as the wiring member 110, a parallel cable or a rigid circuit board may be used.

Fourth Embodiment

Figure 8A:
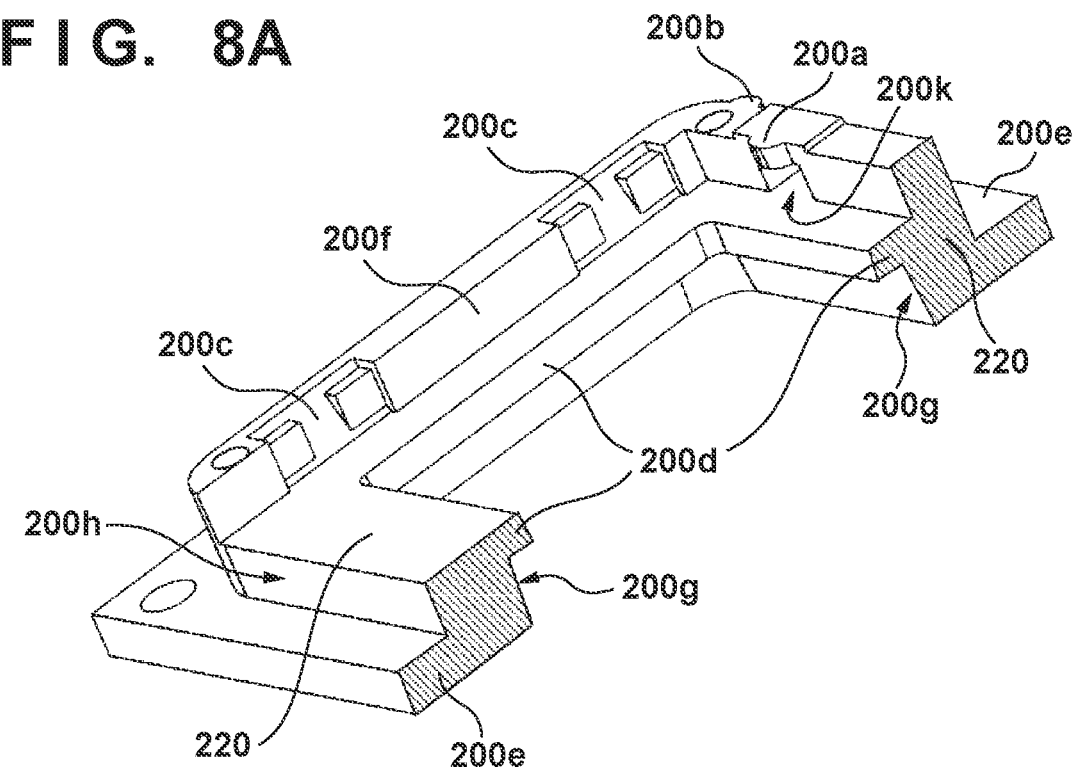
FIGS. 8A and 8B are schematic views showing an optical module according to the present invention.
Figure 8B:
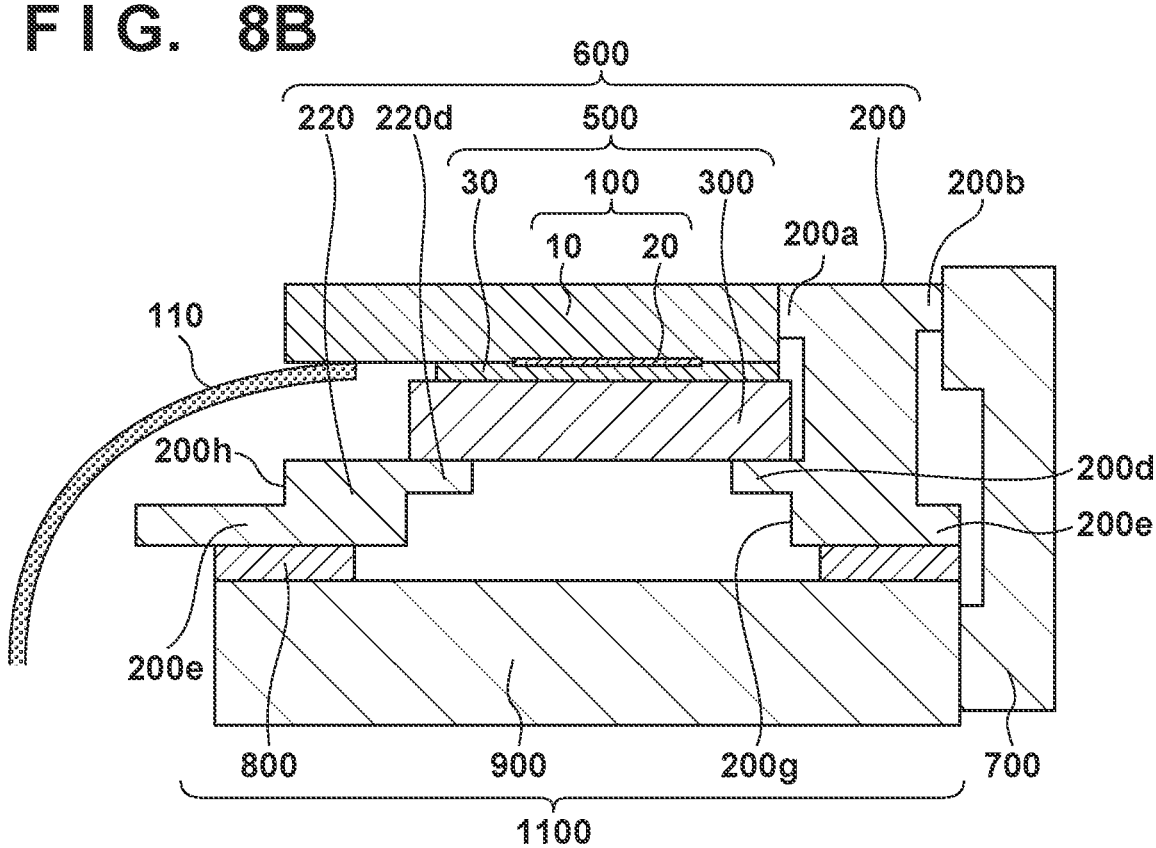

An optical module 1100 that uses an electronic module 600 according to the present invention will be described with reference to FIGS. 8A and 8B. FIG. 8A is a perspective view of a package member 200 obtained in a case in which the package member 200 shown in FIG. 1A has been cut in a direction parallel to a line C-C' of FIG. 2B. The section is hatched in FIG. 8A. As shown in FIGS. 8A and 8B, a base 220 includes a step 200g in the space between itself and an inner frame portion 200d. Arranging the step 200g can suppress the light emitted from the electronic device 500 from being vignetted by the base 220. The base 220 also includes the step 200g in the space between itself and an outer frame portion 200e. Since arranging the step 200g will allow a portion of the wiring member 110 to be positioned on a recess portion formed by the step 200g and the outer frame portion 200e, the degree of freedom in the routing of the wiring member 110 can be increased.

FIG. 8B shows the optical module 1100 in which an optical member 900 has been adhered to the electronic module 600. The optical module 1100 can be, for example, a component that is to be used in a viewfinder of a camera. Alternatively, it may be a component that is to be used in a display of a wearable display. Alternatively, it may be a component that is used in the camera of various kinds of devices. The optical module 1100 includes an adhesive member 800 for fixing the electronic module 600 and the optical member 900. To fix the optical member 900 to the package member 200 of the electronic module 600, the adhesive member 800 is arranged between the optical member 900 and the base 220 (the outer frame portion 200e) of the package member 200. Although the adhesive member 800 may be a member obtained by curing a liquid adhesive, a double-sided tape can be used to suppress contamination caused by the adhesive on the optical member 900 and an electronic device 500. The surface of the bottom portion of the electronic module 600 on the opposite side of the surface on which the electronic device 500 is mounted is flat, and the optical member 900 can be held by the base 220 including the outer frame portion 200e and the inner frame portion 200d. Although the optical member 900 is held by the base 220 in this example, it is not held by the inner frame portion 200d, but is mainly held by the outer frame portion 200e. Considering the shape and the weight of the electronic device 500 and the optical member 900, the width of the outer frame portion 200e can be larger than the width of the inner frame portion 200d and the thickness of the outer frame portion 200e can be larger than the thickness of the inner frame portion 200d, as can be understood from FIG. 8A. The optical member 900 is, for example, a mirror, a lens, a filter, or a cover. The optical member 900 can also be a prism, in particular, a beam splitter. A dichroic prism can be used as a beam splitter.

The image quality accuracy is influenced by the positioning accuracy of the attachment of the optical member 900 to the electronic device 500 for displaying or capturing an image of an object. In addition to an inner convex portion 200a for positioning an electronic device, the electronic module 600 according to this embodiment integrates an outer convex portion 200b for positioning the optical member 900 by using a positioning member 700. The optical member 900 can be positioned in the following manner. That is, the package member 200 (the outer convex portion 200b in this example) is brought into contact with the positioning member 700 as a jig, and the positioning member 700 is subsequently brought into contact with the optical member 900. As a result, the package member 200 and the optical member 900 are positioned with respect to the positioning member 700. The optical member 900 is adhered to the package member 200 by the adhesive member 800 in a state in which both the package member 200 and the optical member 900 are in contact with the positioning member 700.

Hence, the electronic device 500 can be accurately arranged with respect to the inner convex portion 200a as a protruding portion for positioning the electronic device 500. Also, by bringing the positioning member 700 into contact with the protruding outer convex portion 200b and further bringing the optical member 900 into contact with the positioning member 700, the optical member 900 can be accurately arranged with respect to the package member 200. Therefore, the optical member 900 and the electronic device 500 can be positioned accurately with respect to each other. It may be arranged so that the positioning will be performed at a plurality of locations with respect to the housing by arranging the outer convex portion 200b on a plurality of different surfaces of the package member 200. In this manner, the electronic device 500 and the optical member 900 can be positioned accurately by the outer convex portion 200b.

Fifth Embodiment

Figure 9:
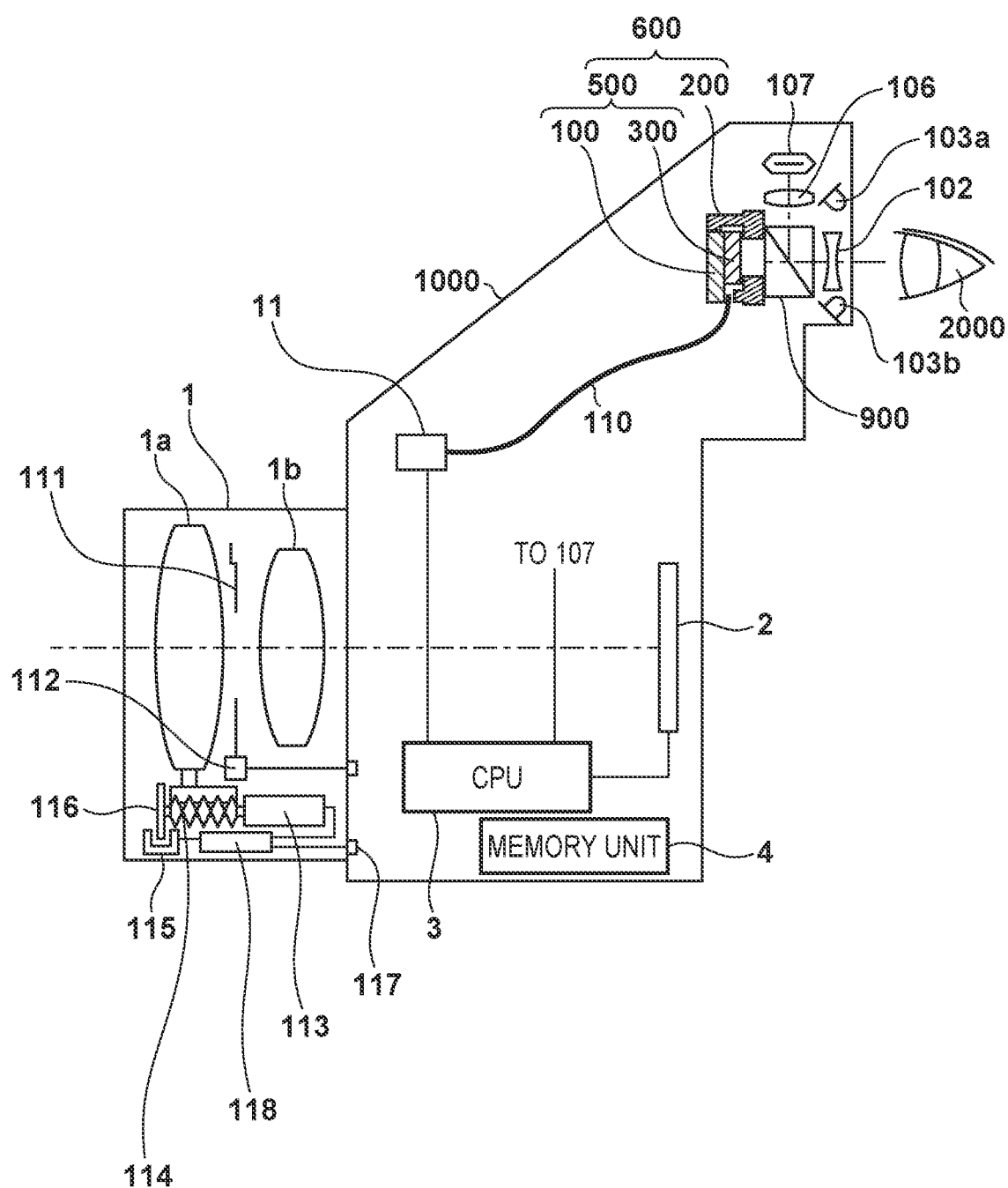
FIG. 9 is a view showing an example of an optical apparatus in which the optical module has been applied according to the present invention.

An example in which an optical module according to the present invention is applied to a viewfinder for line-of-sight detection in a camera 1000 will be described next with reference to FIG. 9. Although the camera 1000 includes imaging lens 1, the camera 1000 need not include the imaging lens 1 in the case of an interchangeable lens camera. Although the imaging lens 1 is illustrated by two lenses 1a and 1b for the sake of descriptive convenience in this embodiment, it can be formed by a plurality of lenses in practice. A stop 111, a stop driving unit 112, a lens driving motor 113, and a lens driving member 114 formed by a driving gear and the like are arranged in the imaging lens 1. A photocoupler 115 detects the rotation of a pulse plate 116, which is interlocked with the lens driving member 114, and transmits the detected rotation to a focus adjustment circuit 118. The focus adjustment circuit 118 is configured to move the imaging lens 1a to an in-focus position by causing the lens driving motor 113 to be driven by a predetermined amount based on this information and the lens driving amount information from the side of the camera. A mount contact 117 is an interface between the camera body and the imaging lens 1. An image capturing device 2 such as a CMOS image sensor or the like is arranged at the expected imaging plane of the imaging lens 1 of the camera 1000.

The camera 1000 includes a CPU 3 that controls the entire camera and a memory unit 4 that stores each image captured by the image capturing device 2. The camera 1000 also includes an electronic device 500 that is a display device formed by an organic EL element or the like for displaying a captured image, a circuit device 11 that drives the electronic device 500, and an eyepiece 102 for observing an object image displayed on the electronic device 500. Light sources 103a and 103b are arranged around the eyepiece 102 and are typically infrared light sources formed by infrared light-emitting diodes. The light sources 103a and 103b illuminate an eye 2000 of the user as a photographer to detect the direction of the line of sight from the relationship between the pupil and a reflected image due to corneal reflex. An illuminated eye image and an image due to corneal reflex of the light sources 103a and 103b are transmitted through the eyepiece 102, reflected by an optical member 900, and formed into images on an optical sensor 107, which is formed by an infrared image sensor, by a light receiving lens 106.

In this example, a beam splitter using a prism is used as the optical member 900, and an electronic module 600 that includes the electronic device 500 including a display element has been arranged. The light receiving lens 106 positions a pupil of eye 2000 and the optical sensor 107 in a conjugate imaging relationship. An image displayed on the electronic device 500 can be observed by the user of the camera via the optical member 900, and the optical sensor 107 can detect the eye 2000 of the user as the photographer via the optical member 900. The optical sensor 107 can receive the light output from the side surface of the optical member 900. The direction of the line of sight is detected by a predetermined algorithm from the positional relationship between the eye image and the image due to corneal reflex of the light sources 103a and 103b formed on the optical sensor 107. The positional relationship between the optical member 900, the eyepiece 102, and the optical sensor 107 can be changed appropriately in accordance with an outer convex portion 200b which is to serve as positioning portion of a package member 200, a positioning member 700, and the structure and the type of the optical member 900.

The light from the imaging lens 1 is converted into an electrical signal by the image capturing device 2 and processed by the CPU 3. An image signal obtained from the processing can be stored in the memory unit 4. The image signal is transmitted in real time from the circuit device 11, via a wiring member 110 such as a flexible printed circuit board, to the electronic device 500 including the display element and displayed. The displayed image can be observed by the photographer via the optical member 900 such as a prism or the like. At this time, the line of sight of the photographer can be detected as an eyeball image of the eye 2000 by the optical sensor 107. An input operation can be performed on the camera 1000 in accordance with the position of the detected line of sight. Accurate recognition of the gaze point of the photographer is important when the detected line of sight is to be input. The recognition accuracy of the line-of-sight input is influenced by the attachment positioning accuracy of the optical member 900 and the electronic device 500 used to display the object. In this embodiment, as described in the fourth embodiment, each positioning portion of the package member 200 can be used to accurately position the electronic device 500 and the optical member 900.

Although the camera 1000 has been exemplified here as an apparatus that includes the electronic module 600 and the circuit device connected to the electronic device 500, the electronic module 600 can be applied to various kinds of apparatuses other than a camera. The circuit device of an apparatus is not limited to a circuit device that drives the electronic device 500, and may be a circuit device that processes signals to be input to the electronic device 500 and signals to be output from the electronic device 500. Alternatively, the circuit device of an apparatus may be a storage device. An apparatus can be an electronic apparatus such as an information terminal (for example, a smartphone or a wearable terminal) which has an imaging function, a camera (for example, an interchangeable lens camera, a compact camera, video camera, or a monitoring camera), or the like. Also, an apparatus can be transportation apparatus (moving body) such as a vehicle, a ship, an airplane, an artificial satellite, or the like. A transportation apparatus can be used as a moving apparatus. An apparatus to be used as a transportation apparatus can be used as an apparatus for transporting the electronic device 500 and an apparatus that assists and/or automates driving (steering) by an imaging function. A circuit device that assists and/or automates driving (steering) is connected to the electronic device 500 and can perform, based on the information obtained by the electronic device 500, processing to operate a mechanical apparatus as a moving apparatus. In addition, an apparatus that includes the electronic module 600 may be a medical apparatus such as a CT, an X-ray apparatus, an endoscope, or the like, a measurement apparatus such as a range sensor, an analysis apparatus such as an electron microscope, or an office apparatus such as a copy machine.

The electronic module 600 according to the embodiment can provide high value (accuracy) to its designer, manufacturer, seller, buyer, and/or user. Hence, the value of an apparatus can be increased by mounting the electronic module 600 on the apparatus. Therefore, when manufacturing or selling a device, determining to mount the electronic module 600 according to this embodiment on an apparatus is advantageous in increasing the value of the apparatus.

The above-described embodiments are merely specific examples of implementing the present invention, and the interpretation of the technical scope of the present invention should not be limited to them. The individual terms described in this specification are merely used for the purpose of explaining the present invention, and the present invention is not limited to the strict meanings of the terms and can also incorporate their equivalents. That is, various changes and modifications can be made to the present invention without departing from its technical spirit or its main features. Therefore, to apprise the public of the scope of the present invention, the following claims are made. Note that the contents disclosed in this specification include not only those described in this specification, but also include every matter that can be grasped from this specification and the accompanying drawings. The disclosed contents of this specification also include the complement of each concept described in this specification. That is, for example, even if it is described as "A is B" in this specification, it can be said that "A is not B" is disclosed by this specification even if the description of "A is not B" has been omitted. This is because a case in which it is described that "A is B" presumes that a case in which "A is not B" has been considered.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2019-199241, filed Oct. 31, 2019, which is hereby incorporated by reference herein in its entirety.

What is claimed is:

1. A method of manufacturing an electronic module that comprises preparing an electronic device in which a first substrate and a second substrate have been joined and coupling the electronic device to a package member, wherein the first substrate includes a front surface on a side of the second substrate, a back surface on an opposite side of the front surface, and a first side surface between an edge portion of the front surface and an edge portion of the back surface, wherein the second substrate includes a first main surface on a side of the first substrate, a second main surface on an opposite side of the first main surface, and a second side surface between an edge portion of the first main surface and an edge portion of the second main surface, and wherein the package member includes a first portion that includes an opening and a second portion that is arranged at a position that does not overlap the opening, the method comprising:
   bringing the first side surface into contact with the second portion in a state in which the second substrate is positioned between the first portion and the first substrate, and
   fixing the electronic device to the package member such that the first side surface is in contact with the second portion and the second side surface is spaced apart from the package member.

2. The method according to claim 1, wherein the preparing of the electronic device includes preparing a first wafer that includes a portion corresponding to the first substrate, preparing a second wafer which includes a portion corresponding to the second substrate, joining the first wafer and the second wafer, and dividing the first wafer and the second wafer after the joining.

3. The method according to claim 1, wherein the preparing of the electronic device includes preparing a wafer that includes a portion corresponding to the first substrate, dividing the wafer to form the first substrate, and joining the first substrate and the second substrate after the dividing.

4. The method according to claim 3, wherein the dividing includes making an incision on the wafer that includes the portion corresponding to the first substrate by a dicing method and dividing the wafer by an external force after the making the incision.

5. The method according to claim 1, wherein the package member includes a wall portion extending from the first portion, and the wall portion and the electronic device are fixed by supplying an adhesive between the wall portion and the first side surface and/or the second side surface.

6. The method according to claim 5, wherein the wall portion includes a concave portion at a position facing the first side surface and/or the second side surface of the electronic device, and the adhesive is supplied into the concave portion.

7. A method of manufacturing an optical module, comprising:
   preparing an optical member, a positioning member, and an electronic module that has been manufactured by a method of manufacturing the electronic module defined in claim 1; and
   fixing the optical member to a package member in a state in which the package member and the optical member have been brought into contact with the positioning member.

8. An electronic module comprising:
   an electronic device in which a first substrate and a second substrate have been joined; and a package member,
wherein the first substrate includes a front surface on a side of the second substrate, a back surface on an opposite side of the front surface, and a side surface between an edge portion of the front surface and an edge portion of the back surface,
wherein the second substrate includes a first main surface on a side of the first substrate, a second main surface on an opposite side of the first main surface, and a side surface between an edge portion of the first main surface and an edge portion of the second main surface,
wherein the package member includes a first portion that includes an opening and a second portion that is arranged at a position which that does not overlap the opening, and
wherein a portion of the second substrate is positioned between the opening and a first region of the first substrate,
wherein another portion of the second substrate is positioned between the first portion and a second region of the first substrate,
wherein the side surface of the first substrate is in contact with the second portion, and
wherein the side surface of the second substrate is spaced apart from the package member.

9. The module according to claim 8, wherein a maximum height of a surface roughness of the side surface of the first substrate is less than a maximum height of a surface roughness of the side surface of the second substrate.

10. The module according to claim 8, wherein the package member includes a wall portion that faces a side surface of the electronic device,
wherein the second portion is on an inner side of the wall portion and is a convex portion protruding toward the side surface between the edge portion of the front surface and the edge portion of the back surface, and
wherein an adhesive intervenes between the electronic device and the wall portion.

11. The module according to claim 8, wherein the package member includes a wall portion that faces the side surface between the edge portion of the front surface and the edge portion of the back surface, and a virtual plane obtained by extending the back surface in a horizontal direction does not intersect with the wall portion.

12. The module according to claim 8, wherein the package member includes a wall portion that faces the side surface between the edge portion of the front surface and the edge portion of the back surface, a portion of the side surface, which is between the edge portion of the front surface and the edge portion of the back surface and in which a virtual plane obtained by extending the back surface in a horizontal direction intersects with the wall portion, does not face the package member, and a portion of a wiring member connected to the electronic device is positioned between the portion of the side surface and the package member.

13. The module according to claim 8, wherein a step is further arranged on the side surface between the edge portion of the front surface and the edge portion of the back surface, and the second portion is in contact with a recess portion of the step.

14. The module according to claim 8, wherein one of a photoelectric conversion element and an organic EL element is arranged on the electronic device.

15. An optical module that comprises an optical member and an electronic module defined in claim 8, wherein the opening is positioned between the optical member and the electronic device, and the optical member is fixed on the package member.

16. The module according to claim 15, wherein the optical member is a prism.

17. A device that comprises an optical module defined in claim 15, an image capturing device, and an optical sensor,
wherein the electronic device is a display device configured to display an image obtained by the image capturing device,
wherein the image displayed by the display device can be observed via the optical member by a user of the device, and
wherein the optical sensor detects an eye of the user via the optical member.

18. A device that comprises an optical module defined in claim 15 and an optical sensor,
wherein the electronic device is a display device configured to display an image,
wherein the image displayed by the display device can be observed via the optical member by a user of the device, and
wherein the optical sensor detects an eye of the user via the optical member.

19. A device comprising:
an electronic module defined in claim 8; and
a circuit device connected to the electronic device.

20. An electronic module comprising:
a package member; and
an electronic device that includes a silicon substrate and a glass substrate,
wherein the silicon substrate includes a front surface on which a plurality of electronic elements are arranged, a back surface on an opposite side of the front surface, and a side surface between an edge portion of the front surface and an edge portion of the back surface,
wherein the package member includes a first portion that includes an opening and a second portion that is arranged at a position that does not overlap the opening,
wherein a first region of the silicon substrate overlaps the opening,
wherein a second region of the silicon substrate overlaps the first portion,
wherein a distance between the front surface and the first portion is smaller than a distance between the back surface and the first portion, and
wherein the side surface of the silicon substrate is in contact with the second portion.

21. The module according to claim 20, wherein the glass substrate includes a first main surface on a side of the front surface, a second main surface on an opposite side of the first main surface, and a side surface between an edge portion of the first main surface and an edge portion of the second main surface, and
wherein the side surface of the glass substrate is spaced apart from the package member.

* * * * *